UNITED STATES PATENT OFFICE.

RUDOLF GARTNER, OF ELBERFELD, AND GEORG KÖHRES, OF LEVERKUSEN-ON-THE-RHINE, GERMANY, ASSIGNORS TO SYNTHETIC PATENTS CO., INC., OF NEW YORK, N. Y., A CORPORATION OF NEW YORK.

TRIARYLMETHANE DYESTUFF.

1,149,575. Specification of Letters Patent. Patented Aug. 10, 1915.

No Drawing. Application filed June 2, 1914. Serial No. 842,479.

*To all whom it may concern:*

Be it known that we, RUDOLF GARTNER and GEORG KÖHRES, doctors of philosophy, chemists, citizens of the German Empire, residing, respectively, at Elberfeld and Leverkusen-on-the-Rhine, Germany, have invented new and useful Improvements in Triarylmethane Dyestuffs, of which the following is a specification.

Our invention relates to the manufacture and production of new and valuable basic coloring matters by condensation of aromatic ethylolamins with aromatic aldehydes and oxidation of the thus obtainable leuco compounds.

The new dyes are characterized by containing in their molecule the aggregation

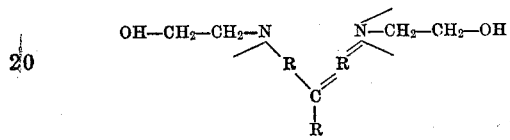

R meaning an aryl group.

The thus obtained coloring matters are powders of a metallic luster, easily soluble in water and alcohol generally with a greenish to bluish coloration, insoluble in ether and benzin, easily soluble in concentrated sulfuric acid generally with a reddish coloration. They dye green to blue shades on cotton mordanted with tannin and tartar emetic. By reduction with hydrochloric acid and zinc powder they yield the corresponding leuco compounds.

In order to illustrate the new process more fully the following example is given, the parts being by weight: 300 parts of diethylol-meta-toluidin are dissolved in 155 parts of hydrochloric acid (37 per cent.) and the resulting solution is heated after the addition of 130 parts of ortho-chlorobenzaldehyde in a vessel provided with a reflux condenser while being stirred during 48 hours to 90–100° C. When the condensation is complete the excess of chlorobenzaldehyde is distilled over with steam and the leuco compound is isolated and dried. The thus obtained colorless leuco compound dissolves in alcohol and dilute mineral acids. The leuco compound may be converted into the coloring matter by oxidation in the following manner: 51 parts of this leuco compound are dissolved in 30 parts of hydrochloric acid (36 per cent.) and 60 parts of acetic acid (50 per cent.) and oxidized with 240 parts of peroxid of lead in paste (10 per cent.) The lead is then removed from this solution by sodium sulfate and filtered off. The dyestuff is salted out with common salt filtered off and dried. It is a bluish-red powder having a metallic luster very easily soluble in water and in alcohol with a green coloration, insoluble in ether and benzin and easily soluble in concentrated sulfuric acid with a yellowish-red coloration. The new dyestuff has most probably the following formula:

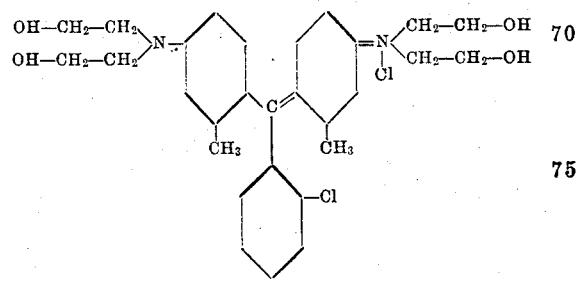

and dyes from an acid bath a pure green tint fast to light on cotton treated with tannin and tartar emetic and yields by reduction with zinc powder and hydrochloric acid the corresponding colorless leuco compound of the following formula:

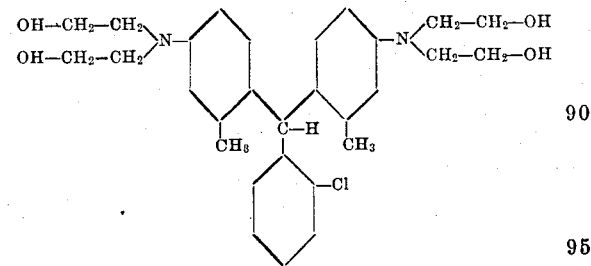

In an analogous manner coloring matters with similar properties result from the following components on the one hand namely monoethylol-ortho-toluidin, diethylolanilin, ethanolethylolanilin, ethylolxylidin, meta-chlor-ethylolanilin, etc., and on the other hand para-diethylaminobenzaldehyde, ortho-sulfobenzaldehyde, naphthaldehyde, benzaldehyde, etc.

We claim:—

1. The new basic coloring matters being condensation products of aromatic aldehydes with aromatic ethylolamins and containing in their molecule the aggregation of the group:

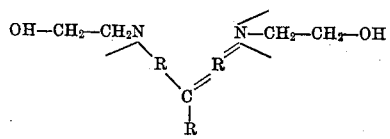

R meaning an aryl group, being powders of a metallic luster, easily soluble in water and alcohol generally with a greenish to bluish coloration, insoluble in ether and benzin, easily soluble in concentrated sulfuric acid generally with a reddish color; yielding by reduction with hydrochloric acid and zinc powder the corresponding leuco compounds; and dyeing green to blue shades on cotton mordanted with tannin and tartar emetic, substantially as described.

2. The new basic coloring matters being condensation products of aromatic aldehydes with aromatic diethylol-amins and containing in their molecule the aggregation of the group:

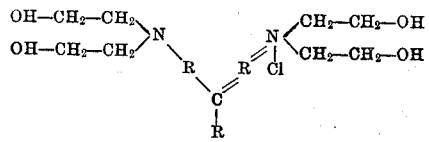

R meaning an aryl group, being powders of a metallic luster, easily soluble in water and alcohol generally with a greenish to bluish coloration, insoluble in ether and benzin, easily soluble in concentrated sulfuric acid generally with a reddish color; yielding by reduction with hydrochloric acid and zinc powder the corresponding leuco compounds; and dyeing green to blue shades on cotton mordanted with tannin and tartar emetic, substantially as described.

3. The new basic coloring matters being condensation products of substituted benzaldehydes with aromatic ethylol-amins and containing in their molecule the aggregation of the group:

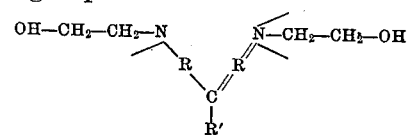

R meaning an aryl group and R' a substituted benzene nucleus, being powders of a metallic luster, easily soluble in water and alcohol generally with a greenish to bluish coloration, insoluble in ether and benzin, easily soluble in concentrated sulfuric acid generally with a reddish color; yielding by reduction with hydrochloric acid and zinc powder the corresponding leuco compounds; and dyeing green to blue shades on cotton mordanted with tannin and tartar emetic, substantially as described.

4. The new basic coloring matters being condensation products of aromatic aldehydes with ethylol toluidins and containing in their molecule the aggregation of the group:

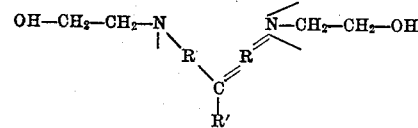

R meaning a methyl substituted benzene nucleus, and R' an aryl group, being powders of a metallic luster, easily soluble in water and alcohol generally with a greenish to bluish coloration, insoluble in ether and benzin, easily soluble in concentrated sulfuric acid generally with a reddish color; yielding by reduction with hydrochloric acid and zinc powder the corresponding leuco compounds; and dyeing green to blue shades on cotton mordanted with tannin and tartar emetic, substantially as described.

5. The new basic coloring matters being condensation products of aromatic aldehydes with diethylol-meta-toludin and containing in their molecule the aggregation of the group:

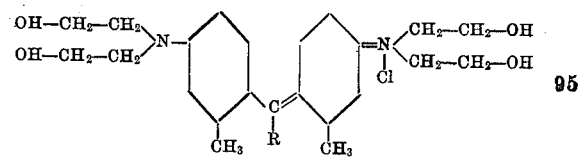

R meaning an aryl group, being powders of a metallic luster, easily soluble in water and alcohol generally with a greenish to bluish coloration, insoluble in ether and benzin, easily soluble in concentrated sulfuric acid generally with a reddish color; yielding by reduction with hydrochloric acid and zinc powder the corresponding leuco compounds; and dyeing green to blue shades on cotton mordanted with tannin and tartar emetic, substantially as described.

6. The new basic dyestuff having most probably the following formula:

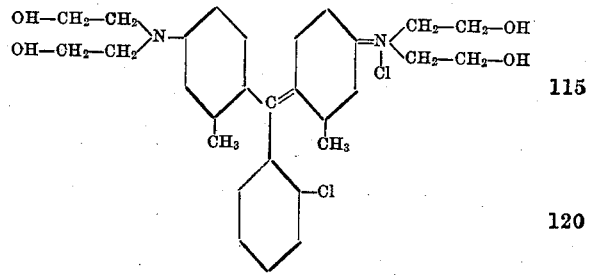

being after dried and pulverized a bluish-red powder of a metallic luster very easily soluble in water and alcohol with a green coloration; insoluble in ether and benzin; easily soluble in concentrated sulfuric acid with a yellowish-red coloration; yielding upon reduction with hydrochloric acid and zinc powder the corresponding colorless leuco compound of the following general formula:
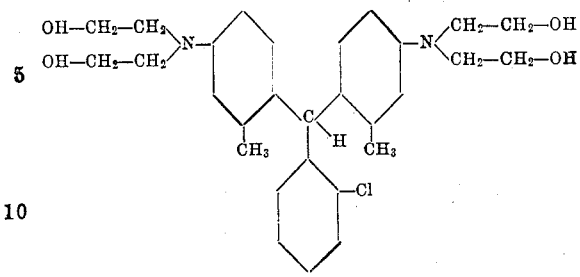
and dyeing from an acid bath a pure green tint fast to light on cotton mordanted with tannin and tartar emetic, substantially as described.
In testimony whereof we have hereunto set our hands in the presence of two subscribing witnesses.
RUDOLF GARTNER.
GEORG KÖHRES.
Witnesses:
ANIS VANBORG,
HANS BRÜCKNER.